United States Patent [19]
Takahashi et al.

[11] Patent Number: 5,826,124
[45] Date of Patent: Oct. 20, 1998

[54] FOCAL PLANE SHUTTER

[75] Inventors: Kunioki Takahashi; Toshiaki Hirai; Makoto Mikami, all of Yotsukaido, Japan

[73] Assignee: Seiko Precision Inc., Japan

[21] Appl. No.: 866,622

[22] Filed: May 30, 1997

[30] Foreign Application Priority Data

May 31, 1996 [JP] Japan .................................. 8-138915

[51] Int. Cl.⁶ ....................................................... G03B 9/40
[52] U.S. Cl. ........................... 396/488; 396/484; 396/487
[58] Field of Search .................................... 396/484, 485, 396/487, 488, 492, 497

[56] References Cited

U.S. PATENT DOCUMENTS 4,571,045  2/1986  Uematsu ................................. 396/484
4,660,952  4/1987  Toyoda et al. ......................... 396/488
5,323,205  6/1994  Matsubara et al. ..................... 396/488
5,646,149  7/1997  Nemoto et al. ......................... 396/497

*Primary Examiner*—A. A. Mathews
*Attorney, Agent, or Firm*—Adams & Wilks

[57] ABSTRACT

A focal plane shutter comprises a base plate having a shutter opening, at least one shutter sector group having sectors, and arms pivotally connected to and supporting the sectors for displacing the sectors relative to the shutter opening. At least a first one of the sectors comprises an intermediate sector interposed between a second one of the sectors and one of the arms connected to and supporting the second sector. The intermediate sector has an edge portion disposed proximate a connection of the second sector and the arm connected to and supporting the second sector. At least the edge portion of the intermediate sector is thinner than other portions thereof to facilitate smooth displacement of the sectors relative to the shutter opening without any obstruction.

13 Claims, 5 Drawing Sheets

FOCAL PLANE SHUTTER

BACKGROUND OF THE INVENTION

1. Field of the Invention

The present invention relates to a focal plane shutter.

2. Prior Art

As is disclosed in Japanese laid open Patent Publication No. H7-20534 or Japanese Utility Model Publication No. H6-26897, the conventional focal plane shutter has been constructed such that two sector groups each comprising a plurality of sectors are supported by arms constituting a parallel link and an aperture through a shutter base plate is opened or closed by operating the two sector groups. The sectors of the sector groups have connecting pins fixed thereto by caulking, respectively, and are pivotally supported by the arms with the connecting pins pivotally fitting in through-holes drilled through the arms. Further, in a state in which the sectors are folded, the outer edge portion of one of the sectors interposes between one of the arms and the other sector supported by the arm at a position close to the connecting pin connecting the arm and the other sector.

The conventional focal plane shutter of the above-described structure has had the disadvantages that in a state in which the sector groups are folded, the edge portion of some sector sometimes gets jammed between one of the arms and the sector connected to the arm through the connecting pin. Particularly, in the present day situation in which the reduction in thickness and size of the camera is in progress to meet the demand for weight reduction and greater speed, the space between the adjoining sectors has inevitably become narrow resulting in giving rise to an adverse effect of causing such jamming phenomenon. That is, the problem has arisen that in the initial stage of operation of closing the shutter aperture, the frictional resistance of the jammed sector becomes large so that a difference takes place between the jammed sector and any other sector free of such jamming with respect to the moving characteristic resulting in reducing the exposure performance of the shutter. Meeting such problem by reducing the thickness of each of the sectors has, however, been difficult in view of the strength and light shielding.

SUMMARY OF THE INVENTION

In order to solve the above-described problem involved in the conventional shutter, the focal plane shutter according to the present invention is constructed such that in order to prevent the edge portion of any other sector from interposing and getting jammed between a certain sector and the arm connecting and supporting that certain sector, the edge portion of the other sector coming close to the connecting section of the certain sector and the arm is thinned so that the frictional resistance of the certain sector may not change irrespective of the position of the above-mentioned other sector, thereby stabilizing the moving characteristic of each of the sectors.

The focal plane shutter according to the present invention comprises a base plate having a shutter opening, an opening sector group including a plurality of sectors, a closing sector group including a plurality of sectors and a plurality of arms each having its one end supported on the base plate so as to pivotally connect and support each of the sectors of the sector groups, respectively, and form themselves a parallel link mechanism wherein the edge portion of any of the sectors which may interpose between a certain sector and a certain arm connecting and supporting the certain sector and which comes close to the connecting portion of the certain sector and the certain arm is thinned so that any obstruction to movement of the interposing sector is avoided.

With the formation of the thinned portion for some sector, the movement of the sector becomes smooth in the initial stage of operation at the time when the sectors are unfolded so that no difference takes place between the opening sector group and the closing sector group with respect to their moving characteristics.

DETAILED DESCRIPTION OF THE PREFERRED EMBODIMENT

A preferred embodiment of the present invention will now be described by referring to the accompanying drawings.

Figure 1:
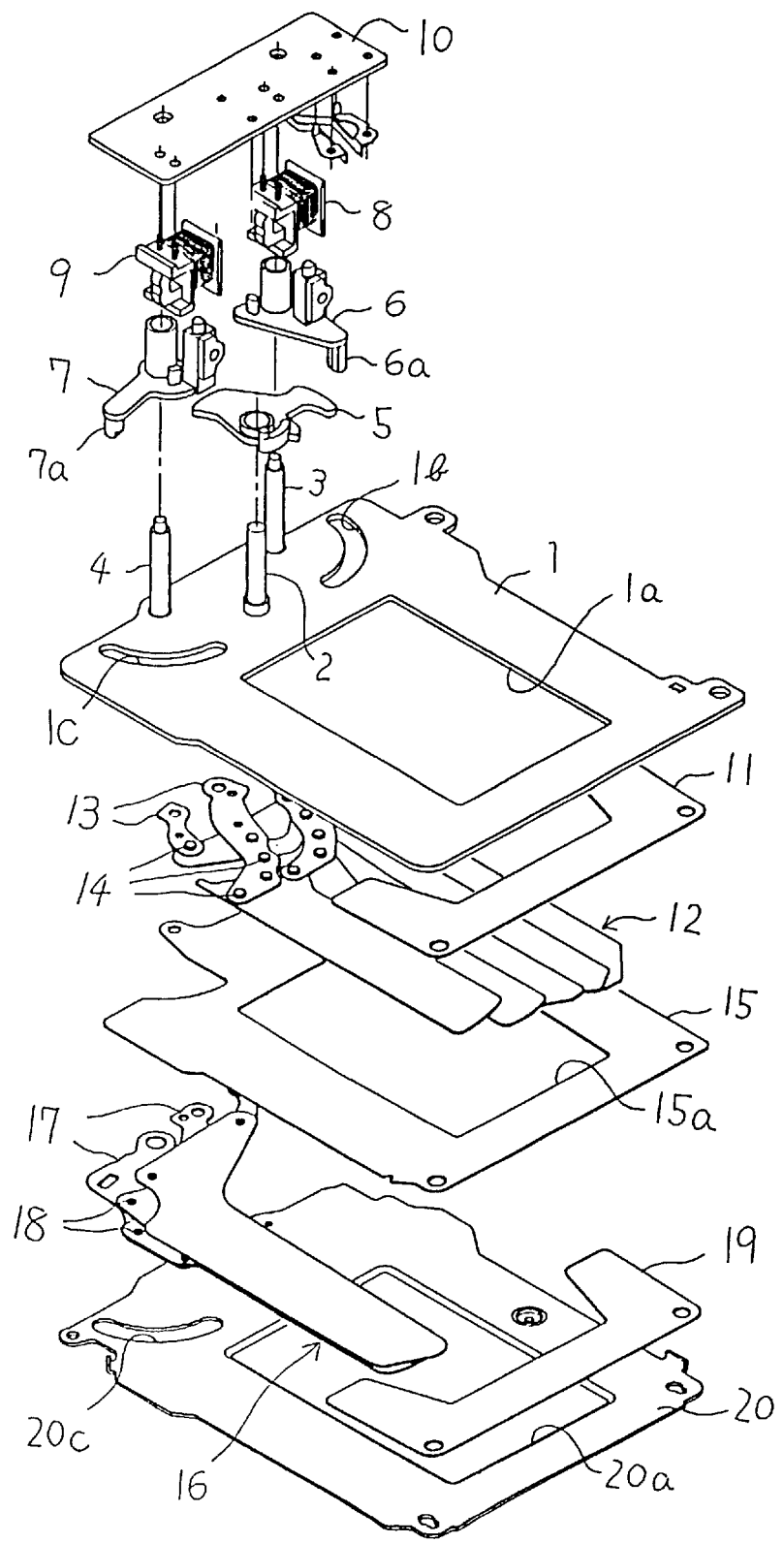
FIG. 1 is an exploded perspective view of a focal plane shutter according to one embodiment of the present invention.

In FIG. 1, a substrate or base plate 1 which is arranged to face a photographing lens of a camera (not shown) is provided with a shutter aperture 1a. Further, a plurality of shafts 2, 3 and 4 are erected upright on the base plate 1 and a set lever 5, an opening lever 6 and a closing lever 7 are pivotally supported by the shafts 2, 3 and 4, respectively. The shafts 3 and 4 project from the rear surface of the base plate 1 to pivotally support arms (to be described later). Further, the base plate 1 is provided with circular arc-shaped elongated holes 1b and 1c for the shafts 3 and 4, respectively, and drive pins 6a and 7a fixed to the opening lever 6 and the closing lever 7, respectively, through these elongated holes are made movable 1b and 1c. The set lever 5, the opening lever 6 and the opening lever 7 are respectively connected with drive springs (not shown). In their set condition, both of the levers 6 and 7 are retained at positions at which they are attracted by electromagnet devices 8 and 9 by means of the set lever 5 and when a release button is pressed, the electromagnetic devices 8 and 9 attract the opening lever 6 and the closing lever 7, the set lever 5 retires by rotating clockwise by the drive spring and the electromagnet devices 8 and 9 are controlled by a control circuit mounted on a circuit substrate 10 so that the opening lever 6 is released first, then after a little time delay, the closing lever 7 is released likewise. After being released, both of the levers 6 and 7 are rotated by the actions of their own drive springs. The positions of the levers shown in FIG. 1 are such that the set lever 5 is in its retired position, the opening lever 6 and the closing lever 7 are at positions at which they are attracted by the electromagnet devices, respectively.

On the rear surface of the base plate 1 there are arranged a sector restraining plate 11 and an opening sector group 12. The opening sector group 12 comprises a plurality of sectors 12a, 12b, . . . such that each of the sectors has two connecting pins 14 attached thereto by fitting these connecting pins 14 into a plurality of arms 13 forming a parallel link mechanism, each of the sectors are pivotally connected to, and supported by, the arms 13. Further, at the rear surface of the opening sector group 12 there is arranged a partition plate 15 which has a shutter aperture 15a.

On the rear surface of the partition plate 15 there is provided a closing sector group 16. The closing sector group 16 comprises a plurality of sectors 16a, 16b, . . . and two connecting pins 18 are fixed to each of the sectors such that these connecting pins 18 are pivotally fitted in a plurality of arms 17 forming a parallel link mechanism so that the sectors are pivotally connected to, and supported by, the arms 17. Further, on the side of the rear surface of the closing sector group 16 there is arranged a sector restraining plate 19. Reference numeral 20 designates a sector plate which is provided with a shutter opening 20a. Further, the sector plate 20 is also provided with an elongated hole 20c at a position corresponding to the elongated hole 1c of the base plate 1. It should be noted that in the state of the shutter being assembled into a camera, a film (not shown) is located on the rear side of the shutter opening 20a.

Figure 2A:
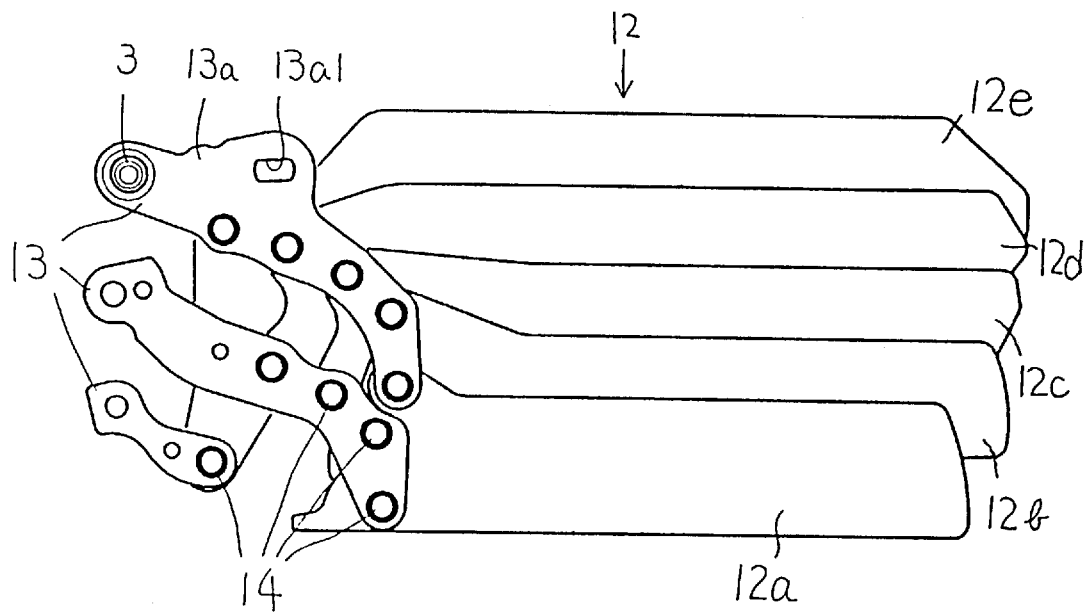
FIG. 2(a) is a front view of an opening sector group of the focal plane shutter of FIG. 1 showing the opening sector group in its set condition.

FIG. 2(a) shows a state in which the opening sector group 12 is set. In this state, the sectors 12a, 12b, . . . of the opening sector group 12 are opened to cover the shutter openings 1a, 15a and 20a. The single arm 13a which pivotally connects and supports the sectors 12a, 12b, . . . is pivotally supported by a portion of the shaft 3 projecting from the rear surface of the base plate on which the shaft 3 is erected and a drive pin 6a of the opening lever 6 passes through the elongated hole 1b so as to be connected to a connecting hole 13a1.

Figure 2B:
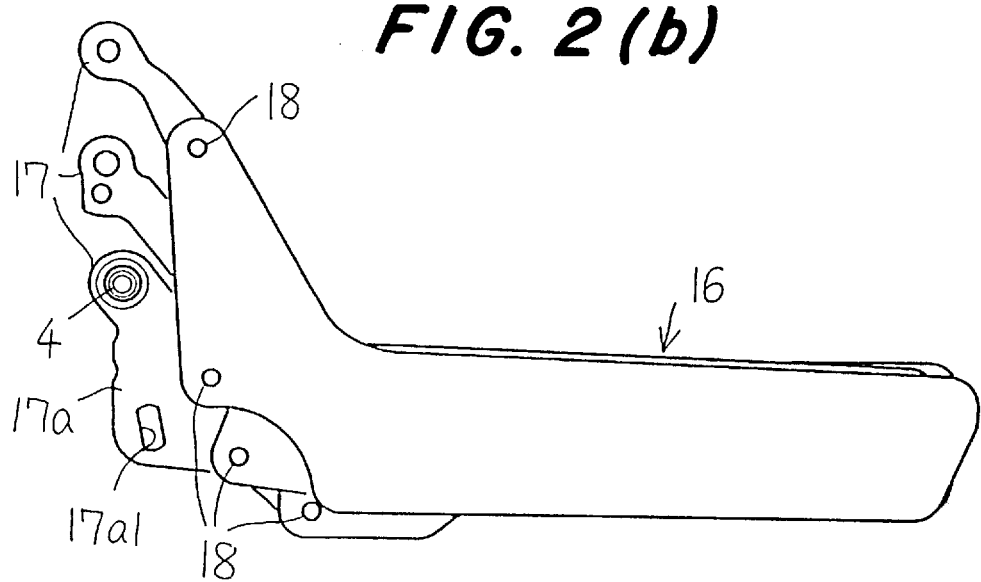
FIG. 2(b) is a front view of a closing sector group of the focal plane shutter of FIG. 1 showing the closing shutter group in its set condition.

FIG. 2(b) shows a state in which the closing sector group 16 is set. In this state, sectors of the closing sector group 16 are folded to overlap one another at a position deviated from the shutter openings 1a, 15a and 20a. The single arm 17a which pivotally connects and supports the closing sector is pivotally supported by a portion of the shaft 4 projecting from the rear surface of the base plate 1 on which the shaft 4 is erected and a drive pin 7a of the closing lever 7 passes through the elongated hole 1c so as to be connected to a connecting hole 17a1 with the top end thereof being made movable within the elongated hole 20c.

Figure 4:
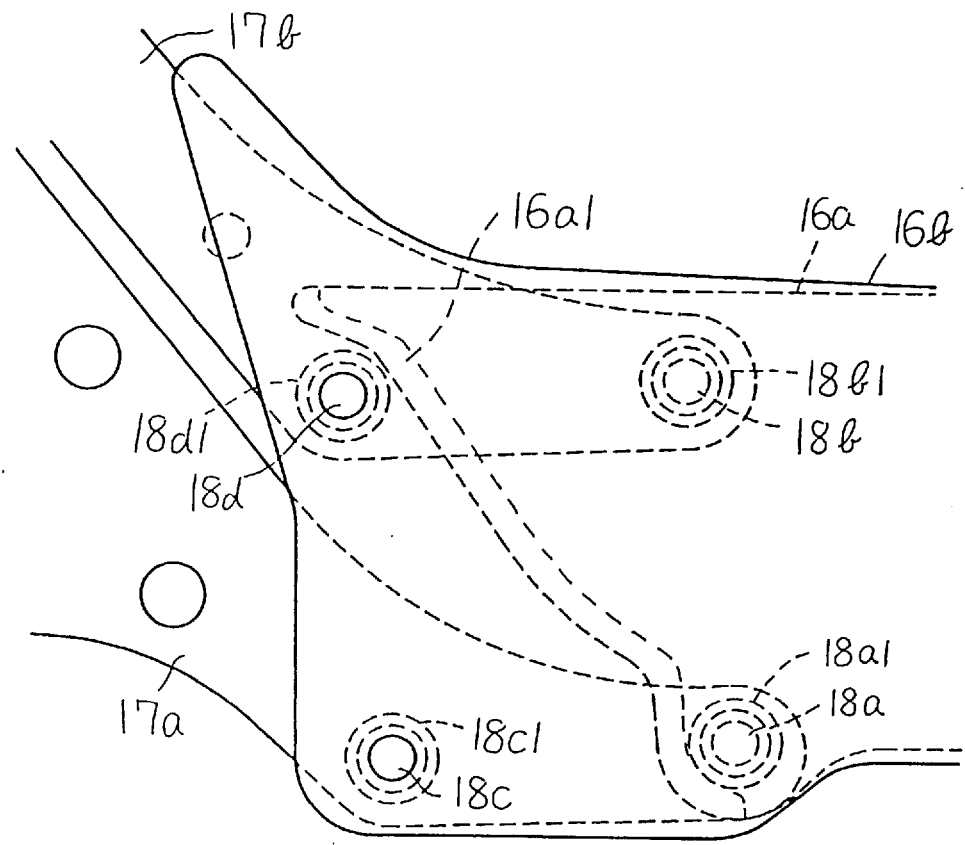
FIG. 4 is an enlarged front view of a portion of FIG. 3.
Figure 3:
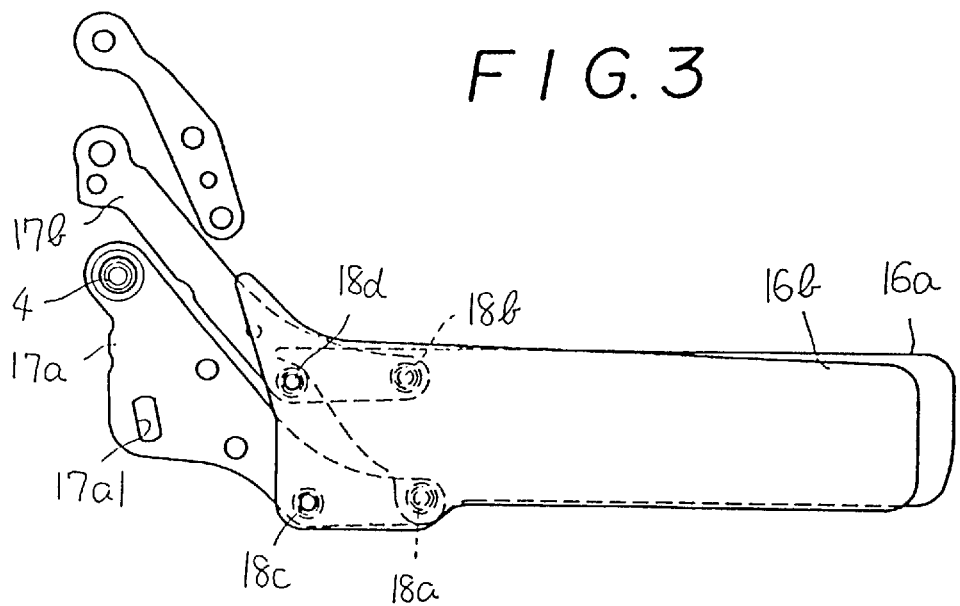
FIG. 3 is a front view of the closing sector group in a partly set condition.

FIG. 3 shows only two sheets of adjoining sectors 16a and 16b in a state in which the closing sector group 16 is set and FIG. 4 shows a partial enlarged view of the sectors in FIG. 3. The sector 16a has the two connect pins 18a and 18b and the two connect pins are pivotally fit in the top ends of the arms 17a and 17b leaving a predetermined space therebetween. The sector 16b has connecting pins 18c and 18d which are pivotally fit in the portions a little inside the top ends of the arms 17a and 17b leaving a predetermined space therebetween. Further, the connecting pins 18a, 18b, 18c and 18d are provided with collars 18a1, 18b1, 18c1 and 18d1, respectively, so that the arms 17a and 17b are unable to slip out and the sectors 16a1 and 16a2 are pivotally connected and supported by the arms 17a and 17b.

Figure 5:
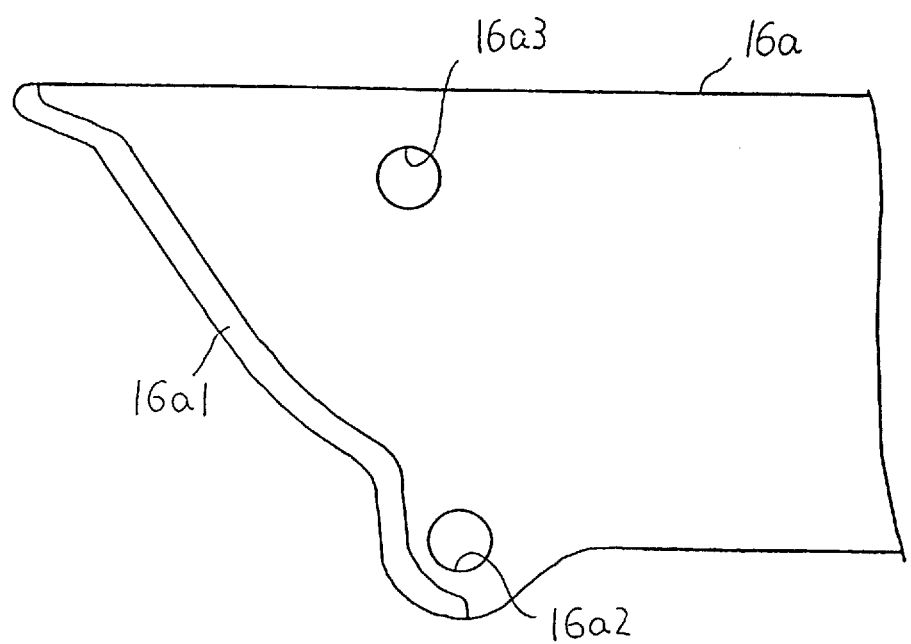
FIG. 5 is an enlarged front view of a portion of one of the sectors of the focal plane shutter according to the present invention.

As shown in FIG. 5, a portion of the outer periphery of the sector 16a is tapered to form a thin portion 16a1 by pressing so as to avoid any obstruction to the movement of the sector as will be described later. Through-holes 16a2 and 16a3 shown in FIG. 5 are those holes which are used in the sector 16a to the connecting pins 18a and 18b.

Figure 6:
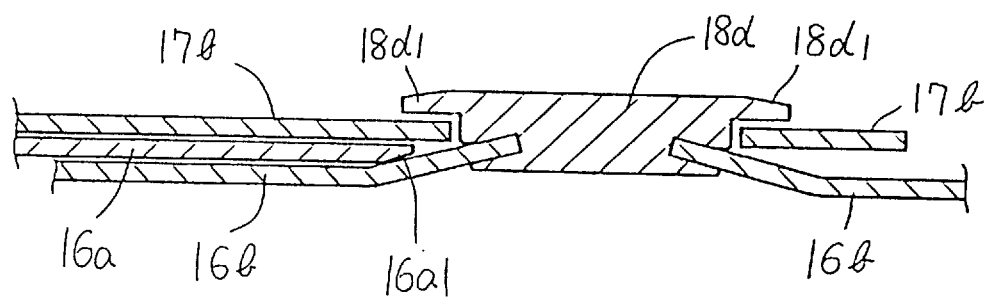
FIG. 6 is an enlarged sectional view of a portion of FIG. 4.

FIG. 6 shows in section a portion of the closing sector group 16 in its folded state which passes through the connecting pin 18d in FIG. 4. In this state, the arm 17b pivotally and unremovably fits on the connecting pin 18d leaving a predetermined space therebetween. The connecting pin 18d is fixed to the sector 16b and the sector 16a defines an intermediate sector interposed between the arm 17b and the sector 16b. Further, a portion of the outer periphery of the sector 16a which enters near the connect pin 18d defines the thin portion 16a1 which avoids any obstruction to the movement of the sector as described above. The space between the arm 17b and the sector 16b is extremely small but due to the existence of the thin portion 16a1, the sector 16a does not get jammed between the arm 17b and the sector 16b so that in the initial stage of operation when the sectors are opened wide, any obstruction to the movement of each sector resulting from jamming of sectors is avoided to thereby operate the shutter smoothly.

Figure 7:
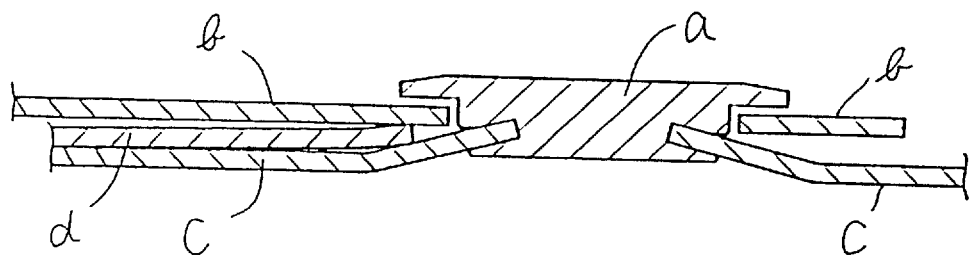
FIG. 7 is an enlarged sectional view of a portion of a conventional focal plane shutter corresponding to FIG. 6.

FIG. 7 shows a portion of a conventional shutter corresponding to the portion of the shutter of the present invention shown in FIG. 6. In FIG. 7, a connecting pin a, an arm b and a sector c are the same as the connect pin 18d the arm 17b and the sector 16b, respectively, of the shutter of the present invention but in this conventional shutter, the thickness of the outer periphery of the sector d entering near the connecting pin a is constant, the sector d gets jammed in the narrow space between the arm b and the sector c. Therefore, as described in the foregoing, in the initial stage of operation when the sectors are opened widely to close the shutter opening, the shuttering operation is not performed smoothly due to an increase in the frictional resistance resulting from the sector d being tightly jammed so that the movement of the closing sector group is obstructed and there arises a difference in moving characteristic between the closing sector group and the opening sector group having no sector jamming, which results in lowering the accuracy of exposure. On the contrary, the shutter according to the present invention can avoid such disadvantage.

It should be noted that FIG. 3 through FIG. 5 illustrate an example in which the sector 16a has the thin portion 16a1 but it is preferable that any other sector have such a thin portion if it interposes between an arm and a sector connected thereto so that there is a danger of the top end of the first-mentioned sector being jammed in the space between the arm and the sector connected thereto at a position near a connecting pin. Further, the above requirement is not always limited to the closing sector group but may be applicable to the opening sector group.

Now, the operation of the focal plane shutter having the above-described structure will be described. In a set condition of the shutter, the opening lever 6 and the closing lever 7 are held at positions, respectively, shown in FIG. 1. Accordingly, as shown in FIG. 1, the opening lever 6 is at a position to which it has moved in the clockwise direction and the sectors of the opening sector group 12 are opened wide to cover the shutter openings 1a, 15a and 20a as shown in FIG. 2(a). Further, the closing lever 7 is at a position to which it has moved in the counter-clockwise direction while the sectors of the closing sector group 16 are folded to overlap one another outside the shutter openings 1a, 15a and 20a.

Now, when the release button is pressed, the set lever 5 retires after the attraction of the opening lever 6 and the closing lever 7 by the electromagnet devices 8 and 9, then the electromagnet device 8 is demagnetized and the opening lever 6 moves counter-clockwise due to the force of the spring attached thereto whereupon the opening sector group 12 moves upward from the state shown in FIG. 2(a) as they are gradually folded to thereby release the shutter openings 1a, 15a and 20a.

Side by side with the opening operation of the opening sector group 12, the electromagnet device 9 is demagnetized after a lapse of a predetermined period of time from the demagnetization of the electromagnet device 8 and the closing lever 7 moves counter-clockwise due to the force of the drive spring attached thereto. Then, with the movement of the lever 7, the closing sector group 16 moves upward as it is gradually opened from the state shown in FIG. 2(b) to thereby cover the shutter apertures 1a, 15a and 20a. In this case, an exposure slit is formed by a slit side (lower side) of the sector 12a (see FIG. 2(a) of the opening sector group 12 for the formation of a slit) and a slit side (upper Side) of the sector 16a (see FIG. 3) of the closing sector group 16 for the formation of a slit and an image is formed on a film during the time when the exposure slit moves upward to cover the shutter openings 1a, 15a and 20a in that order from below. Then, contrary to the state shown in FIG. 2, the opening sector group 12 retires from the shutter openings so as to be folded and the closing sector group 16 comes to cover the shutter openings thereby completing the photographing operation.

As described in detail by referring to FIGS. 5 and 6, the sector 16a of the closing sector group 16 for slit formation has the thin portion 16a1 for avoiding any obstruction to the movement thereof so that the sector 16a does not get jammed between the arm 17a and the sector 16b and the sector 16a moves smoothly at a uniform acceleration from the initial stage of operation in which the closing sector group begins to be opened wide so that the exposure slit as initially set up moves accurately with respect to the shutter apertures thereby performing the photography of a clear and distinct image.

When the film is wound up after the completion of one-frame photography, the set lever 5 is rotated in response to the winding operation to cause the opening lever 6 and the closing lever 7 to rotate clockwise against the forces of the springs attached to the levers 6 and 7. The levers 5, 6 and 7 are held at positions, respectively, to which the sector groups returned as shown in FIGS. 2(a) and 2(b) and kept stand-by until the release button is pressed next.

The focal plane shutter according to the present invention has the advantages that since a part of the outer edge of a particular sector of the closing sector group is made to have a thin portion, even if the particular sector interposes between any other sector and the arm connecting and supporting the other sector with the edge portion of the interposing sector coming close to the connected portion of the other sector and the arm when all the sectors of the closing sector group are folded, the particular sector does not get tightly jammed. Accordingly, when all the sectors are opened widely, the sectors including the interposed sector can move smoothly and the opening and closing sector groups move at a uniform acceleration thereby achieving the photography of a clear and distinct image without lowering the accuracy of exposure.

What is claimed is:

1. A focal plane shutter comprising: a base plate having a shutter opening; an opening sector group including a plurality of sectors; a closing sector group including a plurality of sectors, the opening and closing sector groups being operable to open and close the shutter opening; and a plurality of arms each having one end pivotally supported on the base plate and another end pivotally connected to and supporting the sectors of the opening and closing sector groups for effecting displacement of the sectors relative to the shutter opening to open and close the shutter opening; wherein at least a first one of the sectors is interposed between a second one of the sectors and a first one of the arms connecting and supporting the second sector, and wherein the first sector has an edge portion thereof disposed proximate a connection of the second sector and the first arm, at least the edge portion of the first sector being thinner than other portions thereof to avoid an obstruction of movement of the sectors during displacement thereof.

2. A focal plane shutter as claimed in claim 1; wherein the plurality of arms comprise a plurality of parallel link mechanism.

3. A focal plane shutter as claimed in claim 2; wherein the plurality of parallel link mechanisms comprise a first parallel link mechanism pivotally connected to the base plate and pivotally connected to the opening sector group for effecting displacement of the sectors thereof relative to the shutter opening, and a second parallel link mechanism pivotally connected to the base plate and pivotally connected to the closing sector group for effecting displacement of the sectors thereof relative to the shutter opening.

4. A focal plane shutter as claimed in claim 3; wherein the first and second parallel link mechanisms are superposed one over the other.

5. A focal plane shutter as claimed in claim 1; wherein the first and second sectors comprise sectors of the opening sector group.

6. A focal plane shutter as claimed in claim 1; wherein the first and second sectors comprise sectors of the closing sector group.

7. A focal plane shutter comprising:
    a base plate having a shutter opening extending therethrough;
    a first sector group having a plurality of first sectors for opening the shutter;
    a first parallel link mechanism having a plurality of first arms pivotally connected to the base plate and pivotally connected to and supporting the first sectors for effecting displacement of the first sectors relative to the shutter opening, at least a first one of the first sectors comprising a first intermediate sector interposed between a second one of the first sectors and a first one of the first arms connected to and supporting the second one of the first sectors, the first intermediate sector having an edge portion disposed proximate a connection of the second one of the first sectors and the first one of the first arms, at least the edge portion of the first intermediate sector being a thinner than other portions thereof to facilitate movement of the first sectors during displacement thereof;
    a closing sector group having a plurality of second sectors for closing the shutter opening; and
    a second parallel link mechanism having a plurality of second arms pivotally connected to the base plate and pivotally connected to and supporting the second sectors for effecting displacement of the second sectors relative to the shutter opening.

8. A focal plane shutter as claimed in claim 7; wherein at least a first one of the second sectors comprises a second intermediate sector interposed between a second one of the second sectors and a first one of the second arms connected to and supporting the second one of the second sectors, the second intermediate sector having an edge portion disposed proximate a connection of the second one of the second sectors and the first one of the second arms, at least the edge portion of the second intermediate sector being thinner than other portions thereof to facilitate movement of the second sectors during displacement thereof.

9. A focal plane shutter as claimed in claim 7; wherein the first and second parallel link mechanisms are superposed one over the other.

10. A focal plane shutter comprising: means defining a shutter opening; at least one shutter sector group having a plurality of sectors; and a plurality of arms pivotally connected to and supporting the sectors for displacing the sectors relative to the shutter opening; wherein at least a first one of the sectors comprises an intermediate sector interposed between a second one of the sectors and one of the arms connected to and supporting the second sector, the intermediate sector having an edge portion disposed proximate a connection of the second sector and the arm connected to and supporting the second sector, and at least the edge portion of the intermediate sector being thinner than other portions thereof to facilitate displacement of the sectors.

11. A focal plane shutter as claimed in claim 10; wherein the plurality of arms comprise a parallel link mechanism.

12. A focal plane shutter as claimed in claim 10; including a base plate having the shutter opening extending therethrough; and means pivotally mounting the plurality of arms to the base plate.

13. A focal plane shutter as claimed in claim 12; wherein the plurality of arms comprise a parallel link mechanism.

* * * * *